United States Patent [19]

Isgur et al.

[11] 4,119,602
[45] Oct. 10, 1978

[54] AQUEOUS URETHANE CODISPERSIONS

[75] Inventors: Irving E. Isgur, Framingham; Robert R. Alexander, Milford; Thomas P. Moy, Brighton, all of Mass.

[73] Assignee: W. R. Grace & Co., Cambridge, Mass.

[21] Appl. No.: 785,579

[22] Filed: Apr. 7, 1977

[51] Int. Cl.$^2$ .............................................. C08L 75/08
[52] U.S. Cl. .................... 260/29.6 NR; 260/29.2 TN; 528/45
[58] Field of Search ................ 260/77.5 TB, 77.5 AT, 260/29.2 TN, 29.6 NR

[56] References Cited

U.S. PATENT DOCUMENTS

| | | | |
|---|---|---|---|
| 3,898,197 | 8/1975 | Guise et al. | 260/77.5 TB |
| 3,903,232 | 9/1975 | Wood et al. | 260/2.5 AD |
| 3,998,768 | 12/1976 | Pettit, Jr. | 260/77.5 TB |
| 4,039,517 | 8/1977 | Hamamura et al. | 260/77.5 TB |

FOREIGN PATENT DOCUMENTS 671,042  9/1963  Canada .............................. 260/77.5 TB

*Primary Examiner*—Eugene C. Rzucidlo
*Attorney, Agent, or Firm*—Lowell H. McCarter; C. Edward Parker

[57] ABSTRACT

Disclosed herein are aqueous dispersions of blocked hydrophilic polyether urethane prepolymers and codispersions thereof with synthetic polymer latices. Also disclosed are methods of preparing the dispersions as well as polyurethane coatings and films prepared therewith. The dispersion/codispersions are characterized by good mechanical stability and resistance to freeze - thaw cycles. Coatings, films and impregnated articles prepared therefrom possess good physical properties. Coatings and films prepared from codispersions containing acrylic latex possess physical properties, chemical solvent resistance, etc. comparable to solvent-based urethanes.

22 Claims, No Drawings

AQUEOUS URETHANE CODISPERSIONS

BACKGROUND OF THE INVENTION

It is generally recognized that polyurethanes possess excellent toughness (e.g. abrasion resistance, hardness, high tensile strength) and solvent resistance as compared with "rubbery" materials such as styrene-butadiene (SBR), butadiene and even acrylate-type materials. These properties of toughness and solvent resistance make polyurethanes a preferred material for various coating and molding applications. In forming the polyurethane, the polymer is generally dispersed or dissolved in an organic solvent. Unfortunately the use of solvents is becoming increasingly expensive. Also solvent removal may create ecological problems and further contribute to the expense of solvent-based processess.

To overcome the problems associated with solvent-based systems, aqueous polyurethane latices have been developed. Unfortunately for many applications, the toughness and chemical resistance are not provided by these latices to the same extent as with the solvent-based systems. The properties of polyurethane latices, especially in coating applications, more nearly resemble those obtained using conventional "rubbery" type materials such as SBR. Since the cost of the polyurethane latices is also high, the use of conventional latices (SBR and acrylic especially) in many applications has continued.

Presently there is a need to upgrade the properties of the conventional latices to more nearly resemble those of solvent-based polyurethanes. Specifically it would be desirable to provide coatings based on conventional aqueous latex systems which offer improved toughness and solvent resistance while avoiding or reducing the use of organic solvents.

DESCRIPTION OF THE INVENTION

The invention is an aqueous dispersion of a blocked urethane prepolymer as well as aqueous codispersions of the blocked prepolymer with a synthetic polymer latex. The invention also includes methods of preparing the blocked prepolymer dispersion and prepolymer/latex codispersions as well as the resulting films and coated products formed when the aqueous dispersions are cured.

More specifically, the invention is an aqueous dispersion of a cationically stabilized hydrophilic polyoxyalkylene urethane prepolymer wherein the isocyanate groups are blocked by formation of a condensation product with an oxime. The resulting blocked prepolymer is water-dispersible and has a decomposition temperature of from about 140° C. to about 180° C. By "decomposition temperature" it is meant that the NCO-/oxime condensation product decomposes because the reaction equilibrium is shifted due to heating in the direction of formation of the original NCO and oxime groups. By the term "cationically stabilized" as used in relation to the aqueous dispersion of blocked prepolymer, it is meant that the dispersions have an acidic pH indicating the presence of the hydrogen cation.

The invention also includes anionically stabilized aqueous codispersions of the blocked urethane prepolymer with a synthetic polymer latex. The term "anionically stabilized" refers to the fact that latices useful in the present invention are stabilized by conventional anionic emulsifiers such as sodium stearate, potassium laurate, morpholine oleate, sodium lauryl sulfate, sodium 2-ethyl hexyl sulfate, sodium xylene sulfonate, sodium naphthalene sulfonate, sodium alkyl naphthalene sulfonate, sodium sulfosuccinate, sodium oleic acid sulfonate, sodium caster oil sulfonate, glycerol monostearate containing a sodium fatty alcohol sulfate, glycerol monostearate containing a soap, and the like.

When the above aqueous dispersions are spread on a surface and heated to effect curing, the blocked prepolymer decomposes to yield highly active isocyanate groups which react with hydroxyl, amine and other active hydrogen groups present to produce coatings and films. Codispersions using an acrylic latex are especially desirable in that the properties of the resulting coatings and films compare very favorably with those produced from solvent-based polyurethane systems. Another advantage of the aqueous dispersions is that they are relatively stable, i.e. the aqueous dispersions can be allowed to set in a drum, shipping container, etc. for periods of as long as six months with little, if any, settling out of the solids portion of the dispersion. Also should settling out occur, it is relatively easy to redisperse the solids by simple mixing techniques.

As used herein the term "solids" refers to the active components of the aqueous dispersions. For the aqueous dispersion of blocked prepolymer the solids content would be the weight percentage of blocked prepolymer to the total weight of the aqueous dispersion and would not include the weight of acid, surfactants and any other ingredients employed. Similarly for the aqueous codispersions the solids content is the weight of the polymer latex and blocked prepolymer without regard to surfactants or other ingredients. The weight percent solids would, therefore, be the weight of blocked prepolymer plus latex divided by the total weight of the composition.

To prepare the blocked prepolymer, the oxime and prepolymer are simply admixed at temperatures of from 50° to 70° C. for from about ½ to 1½ hours. A solvent is not necessary although materials such as butyl cellosolve acetate can be employed. Other appropriate solvents include materials which are not reactive with either the oxime or urethane groups. The amount of oxime employed in relation to the isocyanate groups is not critical. Based on the moles of reactive oxime and NCO groups involved, the NOH/NCO molar ratio should be from about 0.35 to about 1.3 and preferably from about 0.65 to about 1.1. Generally it is most effective to use sufficient oxime to completely react with the NCO groups. Upon subsequent admixture with water, the NCO groups are shielded until unblocking is appropriate. To the extent that residual unblocked NCO groups remain, the NCO linkages are destroyed to no advantage when the aqueous dispersion is formed. Therefore, complete blocking is preferable although lesser amounts of oxime can be employed is desired.

In preparing the blocked prepolymer the oxime is selected to provide decomposition temperatures within the range of from about 140° C. to about 180° C. The decomposition temperature is influenced by materials such as catalysts so that in curing the dispersions or codispersions temperatures outside the range of 140°–180° C. can be employed. Curing temperatures of at least 120° C. have proved convenient in view of the curing times which must be employed. Lower temperatures result in longer cure times unless a catalyst is employed. Numerous oximes and catalysts which can be employed are described in: Petersen, Liebigs Ann.

Chem., 562 (1949), p. 215; Wicks, Progress in Organic Coatings, 3 (1975), pp. 73–99; and Hill et al, Journal of Paint Tech., 43 (1971) p. 55. Oximes having the above decomposition temperatures are liquid materials at temperatures of about 80° C., and the condensation products with urethane prepolymers (as described below) are miscible with water or can be dispersed in water with the aid of surfactants. Generally the oximes are aliphatic cyclic, straight-chain or branched materials containing 2–8 (preferably 3–6) carbons.

The cationically stabilized aqueous dispersion of blocked urethane prepolymer is prepared by dispersing the blocked prepolymer in water in the presence of sufficient acid to provide a pH of from about 1.5 to about 5, and preferably from about 1.5 to about 3.5. In the resulting dispersion the solids content is from about 40 to about 100 weight percent. At solids loadings below about 40% it is difficult to stabilize the dispersion. Increasing concentrations, however, do not present stability problems. In preparing the dispersion the acid can be added directly to the blocked prepolymer and admixed therewith followed by dilution with water. This is the preferred method. However, it is also possible to first add the acid to the water together with surfactants, etc., followed by dispersion of the blocked prepolymer in the water. It has been found that if the pH is not controlled within the broad range set forth above, settling problems are encountered and/or portions of the blocked prepolymer react with the water to form a crust. The aqueous dispersions of the blocked prepolymer have been found to be stable for periods of several months at ambient temperatures, e.g. 20° C., and also exhibit excellent resistance to freeze - thaw cycles. The function of the acid is to control pH and the exact acid employed is not critical. Suitable acids include acetic acid and dilute solutions of mineral acids.

The anionically stabilized aqueous codispersions are prepared by admixing the aqueous dispersion of cationically stabilized blocked urethane prepolymer with an aqueous synthetic polymer latex having a pH of at least 6. Following admixture, the pH is adjusted to at least 9 by addition of base such as ammonium hydroxide. Since the function of the base is to adjust pH the specific base employed is not critical. In addition to ammonium hydroxide other common materials such as sodium hydroxide or potassium hydroxide can also be employed. Alternatively, prior to addition to the blocked prepolymer dispersion, the pH of the aqueous latex can be raised by base addition. Whichever method is selected, sufficient base is employed to compensate for the high level of acidity of the blocked prepolymer dispersion and provide a final pH in the codispersion of at least 9.

The pH range of the codispersion is not critical so long as a pH of at least 9 is maintained. At lower levels settling out becomes a problem. Generally a pH range of from about 9.5 to about 11 is preferred. The total solids of the codispersion is generally in excess of about 50%. An acceptable level is from about 20–50% and preferably from 35–45%. The relative amounts of blocked prepolymer and latex employed are not critical. To the extent that the amount of blocked prepolymer employed is reduced, the physical properties attributable to the prepolymer are reduced, e.g. tensile strength, hardness, solvent resistance and durability. The blocked prepolymer is generally from about 5–95% of the solids content of the codispersion and preferably is at least 50%. As discussed above the balance of the solids content is attributed by the synthetic polymer latex solids.

In forming the codispersions conventional surfactants can be employed if desired, although the use of surfactants other than those present in the latex is not necessary. The shelf life of the aqueous codispersions has been found to be at least 3 months. The codispersions also exhibit excellent resistance to freeze - thaw cycles.

The aqueous dispersions and/or codispersions of the invention are employed by spreading over the surface of a substrate using rollers, doctor bars, and other conventional spreading techniques followed by drying at about 75° to 150° C. for about 2 to 20 minutes and curing at about 120°–250° C. for from about 0.5 to 5 minutes. A similar technique is employed in forming films from the aqueous codispersions. In coating applications, suitable substrates include polyurethane films and films or surfaces formed from other polymers such as polyesters, polyamides, etc.

Provided the heating temperature is sufficient to cause decomposition of the blocked prepolymer, the exact temperature and heating time is not critical and optimum conditions will vary with the thickness of the desired coating or film and the amount of water in the dispersion or codispersion. Within the time/temperature ranges provided above and using dispersions and codispersions with solids loadings of 20–50%, the films or coatings produced have a thickness of from about 2–10 mils. As discussed above the films and coatings are relatively hard and have good resistance to solvents depending upon the amount of blocked prepolymer employed. Films also have been found to possess a "glossy" appearance. In certain instances it has been discovered that the use of a solvent such as butyl cellosolve acetate results in coatings which are "tacky." This problem can be overcome by not using the solvent.

In addition to forming coatings and films, the dispersion/codispersions can be employed as impregnants for conventional substrates such as non-wovens or webs formed from cotton, polyester, rayon, nylon and similar conventional fibers. The impregnated materials upon curing can be made to increase tensile strength, wear resistance, etc.

The synthetic polymer latices employed are those having a pH of at least 6 and the ability to remain stable for at least ½ hour after the pH has been adjusted from 9.5 to 11. By "stable" it is meant that at least 90% of the solids content of the latex remains dispersed after ½ hour at the above pH range.

Examples of suitable latices include conventional latices satisfying the above tests and having a pH of at least 6 and formed as a copolymer of a vinyl carboxylic acid (e.g. acrylic acid) with at least one additional ethylenically polymerizable monomer such as vinyl aromatic hydrocarbons (e.g. styrene or α-methyl styrene) and vinyl aliphatic hydrocarbons (e.g. butadiene) and derivatives of acrylic acid (e.g. acrylonitrile, acrylic esters and amides) and materials such as vinyl chloride. The acrylic and styrene-butadiene latices are preferred. Other examples include butadiene-acrylonitrile, polystyrene and vinyl pyridine latices.

Urethane prepolymers useful in the invention are prepared by capping a polyoxyalkylene polyol with an excess of polyisocyanate, e.g. toluene diisocyanate. Prior to capping the polyol should have a molecular weight of from about 200 to about 20,000, and preferably from about 600 to about 6,000. The hydroxyl functionality of the polyol and the corresponding isocyanate functionality following capping is from 2 to about 8. If coatings or films are formed from prepolymers with an isocyanate functionality of about 2 the resulting product is essentially linear and does not have as much tensile strength as if it was crosslinked. Accordingly, if the isocyanate functionality is about 2 a crosslinker can be employed although the linear non-crosslinked materials are operable in the present invention. Suitable crosslinkers are well known in the polyurethane art and include by way of example tolylene-2,4,6-triamine, ethylene diamine, diethanolamine, diethylenetriamine, triethylene-tetramine, tetraethylenepentamine, and ethanolamine.

Examples of suitable polyols (to be capped with polyisocyanates) include: (A) essentially linear polyols formed for example by reaction of ethylene oxide with ethylene glycol as an initiator. As discussed above mixtures of ethylene oxide with other alkylene oxides can be employed so long as the mole percent of ethylene oxide is at least 50 percent. Where the linear polyethers are mixtures of ethylene oxide with, e.g. propylene oxide, the polymer can be either random or a block copolymer and the terminal units can be either oxyethylene or oxypropylene. A second class of polyol (B) includes those with a hydroxy functionality of 3 or more. Such polyols are commonly formed by reacting alkylene oxides with a polyfunctional initiator such as trimethylolpropane, pentaerythritol, etc. In forming the polyol B, the alkylene oxide used can be ethylene oxide or mixtures of ethylene oxide with other alkylene oxides as described above. Useful polyols can be further exemplified by (C) linear branched polyfunctional polyols as exemplified in A and B above together with an initiator or crosslinker. A specific example of C is a mixture of polyethylene glycol (m. w. about 1,000) with trimethylolpropane, trimethylolethane or glycerine. This mixture can be subsequently reacted with excess polyisocyanate to provide a prepolymer useful in the invention. Alternatively the linear or branched polyols, (e.g. polyethylene glycol) can be reacted separately with excess polyisocyanate. The initiator, e.g. trimethylolpropane, can also be separately reacted with polyisocyanate. Subsequently the two capped materials can be combined to form the prepolymer.

Suitable polyisocyanates useful in preparing prepolymers include toluene-2,4-diisocyanate, toluene-2,6-diisocyanate, commercial mixtures of toluene-2,4- and 2,6-diisocyanates, ethylene diisocyanate, ethylidene diisocyanate, propylene-1,2-diisocyanate cyclohexylene-1,2-diisocyanate, cyclohexylene-1,4-diisocyanate, m-phenylene diisocyanate, 3,3'-diphenyl-4,4'-biphenylene diisocyanate, 4,4'-biphenylene diisocyanate, 3,3'-dichloro-4,4'-biphenylene diisocyanate, 1,6-hexamethylenediisocyanate, 1,4-tetramethylene-diisocyanate, 1,10-decamethylenediisocyanate, 1,5-naphthalenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate, 2,4-dimethyl-1,3-phenylenediisocyanate, 4,4'-diisocyanatodiphenylether, benzidinediisocyanate, 4,6-dimethyl-1,3-phenylenediisocyanate, 9,10-anthracenediisocyanate, 4,4'-diisocyanatodibenzyl, 3,3'-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-diemthoxy-4,4'-diisocyanatodiphenyl, 1,4-anthracenediisocyanate, 2,5-fluorenediisocyanate, 1,8-naphthalenediisocyanate, 2,6-diisocyanatobenzfuran, 2,4,6-toluenetriisocyanate, and p,p',p''-triphenylmethane triisocyanate.

Suitable initiators useful in preparing prepolymers include propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, 1,2,6-hexanetriol, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)methylpentanediol-1,5, 1,1,1-tris[(2-hydroxyethoxy)methyl]ethane, 1,1,1-tris[(2-hydroxypropoxy)methyl]propane, triethanolamine, triisopropanolamine, resorcinol, pyrogallol, phloroglucinol, hydroquinone, 4,6-di-tertiarybutyl catechol, catechol, and orcinol.

The following examples are submitted to illustrate the invention.

EXAMPLES 1–9

Comparison of Codispersions with Solvent-based Polyurethanes

Eight codispersions of oxime-blocked urethane dispersed in an SBR or acrylic latex were prepared. In preparing the codispersions a urethane prepolymer was admixed with enough butanone oxime on a theoretical basis to block the isocyanate groups present. In some of the runs butyl cellosolve acetate was used as a solvent for the prepolymer. The blocking reaction was exothermic. After the exotherm had subsided, the reaction mixture was heated to 50°–65° C. for about 30 minutes. The NCO number was determined and the mixture was added with stirring to the latex which had been diluted with distilled water. The NCO number is the moles of NCO groups per mole of blocked prepolymer and indicates the extent to which blocking was achieved. The parameters used to prepare the eight samples are shown in Table I below.

TABLE I

| Example | Type of Urethane(1) | Butyl Cellosolve Solvent | NCO Number | Types of Latex(4) | % Solids in Codispersion(5) |
|---|---|---|---|---|---|
| 1 | B(3) | No | 0.059 | acrylic | 25% |
| 2 | A(2) | No | 0.079 | SBR | 25% |
| 3 | B | No | 0.076 | SBR | 35% |
| 4 | A | No | 0.442 | acrylic | 35% |
| 5 | B | Yes | 0.095 | SBR | 35% |
| 6 | A | Yes | 0.145 | acrylic | 35% |
| 7 | B | Yes | 0.087 | acrylic | 25% |

TABLE I-continued

| Example | Type of Urethane(1) | Butyl Cellosolve Solvent | NCO Number | Types of Latex(4) | % Solids in Codispersion(5) |
|---|---|---|---|---|---|
| 8 | A | Yes | 0.069 | SBR | 25% |

(1)In each example about 29 parts of prepolymer were empolyed.
(2)A = prepolymer prepared from 2 moles of poly(oxyethylene) diol (m.w. 1000), 1 mole of TMOP and 110% TDI, based on the theoretical amount necessary to cap all OH groups.
(3)B = prepolymer prepared from 2 moles of poly(oxyethylene) diol (m.w. 1000), 0.66 moles of TMOP and 105% TDI, based on the theoretical amount necessary to cap all OH groups.
(4)The acrylic latex was Dartax 410L. The SBR latex was Darex 510L. Both latices are commercially available from W. R. Grace & Co. In each example about 71 parts of latex were employed.
(5)Since the prepolymer is water-miscible, the % Solids is contributed almost entirely by the polymer latex.

The codispersion samples were used to saturate nonwoven polyester webs. All samples were cured at 205° C. for 1 minute. The cured samples were tested for tensile strength, both dry and wet and after soaking in perchloroethylene. The percent elongation was also determined.

Optimizing the variables employed in the first eight samples, a ninth sample was also prepared and tested.

As a comparison two solution-type polyurethanes were prepared and tested. The polyurethanes were Permuthane U-6366 and Witcobond Y-307 (Witco Chemical Corp.). Each was employed as a 9% solution of the polyurethane in a toluene/alcohol mixture to facilitate saturation of the web. The levels of polyurethane employed were comparable to the levels of codispersions employed.

As a further comparison, a polyester web was saturated with an acrylic emulsion (Rhoplex, available from Rohm and Haas) and cured as above.

Testing results for the samples are set forth in the following table.

proved. Generally the acrylic latex codispersions exhibited better tensile strength after soaking in perchloroethylene than did the SBR latexes.

The acrylic codispersions are equivalent to the polyurethane solutions in all properties tested.

EXAMPLES 10–13

In Examples 10–13, a urethane prepolymer was admixed with butanone oxime. An exothermic reaction took place after which the temperature of the reaction mixture was maintained at 55°–60° C. for about ½ hour. This mixture was added to an aqueous polymer latex diluted with sufficient water so that in the latex/blocked prepolymer reaction mixture the "% solids" was 20–35%. The codispersion was used to saturate a polyester web and was cured at 205° C. for 1 minute. More details of the preparation and the properties of the resulting product are set forth in Table III.

TABLE III

| | | | Latex | | | Physical Properties[4] | | | |
|---|---|---|---|---|---|---|---|---|---|
| Example | Prepolymer[1] | Butanone Oxime | Type[2] | Amount | Final % Solids[3] | Dry Tensile | Wet Tensile | Perchloroethylene | Elongation |
| 10 | A 207 g | 45.6 g | acrylic | 1315 g | 33% | 18 | 16 | 13.0 | 25% |
| 11 | B 25 g | 5.5 g | SBR | 139 g | 35% | 15.8 | 16.5 | 1.2 | 34.5% |
| 12 | C 30 g | 5.5 g | acrylic | 148 g | 20% | 17.5 | 14.2 | 6.0 | 26.7% |
| 13 | A 103 g | 22.8 g | acrylic | 660 g | 25% | 30.0 | 26.8 | 18.0 | 31.8% |

[1]Prepolymers A and B are described in Table I. Prepolymer C is the reaction product of PEG - 1000, trimethylolethane and glycerol (1:2:1) with 110% TDI.
[2]Latex, acrylic = Darex 410L, W. R. Grace & Co.
  SBR = Darex 510L, W. R. Grace & Co.
[3]Demineralized water was present in the prepolymer/latex codispersion to achieve the % solids indicated. In Example 12, the water contained 0.5 g. of surfactant (Irganox 100, Ciby-Geigy). In Example 13, the water contained 21 g. Pluronic L-64 and 76 g. isopropanol.
[4]Measured as described in Table II.

EXAMPLE 14

A stable aqueous dispersion of blocked urethane pre-

TABLE II

| | | Tensile Strength | | | |
|---|---|---|---|---|---|
| Example | Viscosity(1) | Dry(1) | Wet(1) | Perchloroethylene(1) | % Elongation(1) |
| 1 | 1 | 20.0 | 18.5 | 7.5 | 27.9 |
| 2 | 1 | 26.0 | 33.0 | 4.5 | 26.4 |
| 3 | 1 | 15.8 | 16.5 | 1.2 | 34.5 |
| 4 | 10 | 30.5 | 28.5 | 16.2 | 28.2 |
| 5 | 8 | 20.0 | 19.0 | 1.7 | 61.8 |
| 6 | 10 | 22.0 | 14.0 | 13.4 | 27.0 |
| 7 | 1 | 27.3 | 25.5 | 13.0 | 28.2 |
| 8 | 1 | 20.0 | 17.5 | 1.4 | 20.0 |
| Average of 8 | 4 | 22.7 | 21.6 | 7.4 | 31.8 |
| 9 | 1 | 18.0 | 16.3 | 13.4 | 25.2 |
| Polyurethane A(2) | | 16.5 | 16.7 | 12.0 | 25.5 |
| Polyurethane B(3) | | 15.3 | 15.2 | 11.0 | 25.8 |
| Acrylic latex(4) | | 14.8 | 12.2 | 4.2 | 30.0 |

(1)Determined using TAPPI T-494 modified to employ constant rate of elongation of 12 inches/minute; initial jaw separation of 4 inches; test samples 1 inch wide. Dry tensile was determined on samples conditioned as described. Wet tensile samples were immersed in water for five minutes prior to testing. Perchloroethylene test samples were soaked for 60 minutes. Elongation was measured at the sample break point.
(2)Polyurethane A was Permuthane U-6366 dissolved in toluene/alcohol mixture at a level of about 9% by weight.
(3)Polyurethane B was Witcobond Y-307 dissolved in toluene/alcohol at a level of about 9% by weight.
(4)The acrylic latex waS Rhoplex HA-8 (Rohm and Haas).

From Table II it can be seen that properties of acrylic latex codispersions were superior to the acrylic latex by itself. Also the properties of the SBR latexes are impolymer was prepared by admixing 14,000 g. of the urethane prepolymer described in Prepolymer A (Table I) with 3,080 g. of butanone oxime. After the blocking reaction had taken place the reaction product was dissolved in 2,980 g. demineralized water containing 1,225 g. of glacial acetic acid. The final solution of the blocked polymer in the aqueous acetic acid contained 76.5% total solids at a pH of 3.6. The viscosity was 3,600 centipoise (cps.) at 30° C.

To form a coating the solution was spread on a surface and cured at 150° C. for 3 minutes. Curing can be accomplished with or without a catalyst. Suitable catalysts, if employed, include materials such as diethyleneamine and similar low molecular weight polyalkylene polyamines having from 1 to 1-9 carbon atoms and 2-5 nitrogen atoms. Coatings formed had a non-tacky surface also characterized as being "glossy." The surface was also hard and durable, and was comparable to coatings obtained from solvent-based polyurethanes.

EXAMPLE 15

To 6,652 g. of the aqueous dispersion of blocked prepolymer prepared as in Example 14 was added 12,595 g. of carboxylated SBR (55% solids - Darex 510L, available from W. R. Grace & Co.) and 730 g. of concentrated $NH_4OH$ along with 3,330 g. $H_2O$. Following stirring a uniform codispersion of latex and blocked prepolymer resulted. The material had a final solids content of 39.6%, pH of 9.6, viscosity of 610 cps. at 25° C. and had a creamy white appearance. The codispersion was stable through a number of freeze-thaw cycles and also exhibited excellent mechanical stability, i.e. there was little if any settling out.

EXAMPLE 16

To 3,209 g. of blocked prepolymer as prepared in Example 14 was added 48 g. of diphenyl disodium sulfonate surfactant, 195 g. of demineralized water, 13,090 g. of acrylic latex (47.3% solids - Darex 410L, W. R. Grace & Co.), 245 g. of concentrated $NH_4OH$ and 8,220 g. of demineralized water. The ingredients were added sequentially in the order recited. After admixing the final pH of the codispersion was 9-10, total solids 31%, and viscosity was 500-1,000 cps. The codispersion exhibited excellent mechanical stability and was stable through a number of freeze-thaw cycles.

EXAMPLE 17

A codispersion was prepared using 8,295 g. of Prepolymer B described in Table I, 1,105 g. of butanone oxime, 365 g. of glacial acetic acid and 4,420 g. of demineralized water. The reactants were admixed as in Example 14 to provide a stable aqueous dispersion of the blocked prepolymer. To the dispersion of blocked prepolymer was added 3,318 g. of demineralized water containing 830 g. of diphenyl disodium sulfonate surfactant. Following addition of the water 9,014 g. of acrylic latex (Darex 410L) and 8,295 g. of acrylic latex (Tylac 5040, 48.4% solids, Reichold Company) was added followed by 1,659 g. of $NH_4OH$, 5,530 g. demineralized water, 33.2 g. of surfactant (Polysol PL5, Polymeric Chemicals), and 553 g. of thickener (Acrylsol, Rohm and Haas Company). The pH of the resulting codispersion was 9.5-10, viscosity was 600-1,000 cps. and the percent solids was about 40%. As in the preceding examples the codispersion exhibited good mechanical stability and resistance to freeze-thaw cycles. Codispersions prepared as in this Example are beige or white in color.

Preparation of Prepolymers

Prepolymer A described in Table I was prepared by admixing 2 molar equivalents of polyethylene glycol having an average molecular weight of 1,000 (PEG - 1,000) and one molar equivalent of trimethylolpropane (TMOP). The admixture was dried at 100°-110° C. under a pressure of 5-15 Torr to remove water. The resulting dried mixture was slowly added over a period of about one hour to a vessel containing 6.65 molar equivalents of toluene diisocyanate (TDI) while stirring the TDI and polyol mixture. The temperature was maintained at 60° C. The mixture was maintained at 60° C. with stirring for three additional hours. Then an additional 1.05 molar equivalent of TDI was added with stirring over a period of about 1 hour while maintaining the temperature at 60° C. The final reaction mixture contained a 10% molar excess of TDI. All hydroxyl groups were capped with isocyanate and some chain extension occurred because of crosslinking of the polyols with TDI.

Prepolymer B described in Table I was prepared similarly to Prepolymer A with the exception that 0.66 molar equivalents of TMOP were employed for every 2 molar equivalents of PEG - 1,000. In the initial capping reaction with TDI, the amount of TDI employed was about 92% of that theoretically required to cap all hydroxyl groups in the polyol mixture. Subsequently, an additional 13% TDI was added to provide a theoretical molar excess of about 5%.

What is claimed is:

1. An anionically stabilized aqueous codispersion of a blocked urethane prepolymer and a synthetic polymer latex, said codispersion having a solids loading not exceeding about 50%, said blocked prepolymer comprising the condensation product of a hydrophilic polyoxyalkylene urethane prepolymer with an oxime and having a decomposition temperature of from about 140° to about 180° C.; said synthetic polymer latex having a pH value of at least about 6 selected from the group consisting of (1) copolymeric latex of a vinyl carboxylic acid with at least one additional ethylenically polymerizable monomer selected from the group consisting of (a) vinyl aromatic hydrocarbons (b) vinyl aliphatic hydrocarbons, (c) derivatives of acrylic acid, and (d) vinyl chloride, (2) butadiene-acrylonitrile latex, (3) polystyrene latex, (4) vinylpyridine latex, (5) styrene-butadiene latex, and (6) acrylic latex, said urethane prepolymer being water-dispersible and the reaction product of a polyoxyalkylene polyol containing at least 50 mole percent ethylene oxide, a molecular weight between about 200 to 20,000 and a hydroxy functionality of from about 2 to 8 with an excess of a polyisocyanate; said blocked prepolymer having a NOH/NCO molar ratio of from about 0.65 to about 1.1, said blocked prepolymer being from about 5 to about 95% of the solids content of said codispersion with the balance of the solids being said synthetic polymer latex; said codispersion having a pH value adjusted to a value of at least about 9.

2. A codispersion as in claim 1 wherein the oxime is butanone oxime.

3. A codispersion as in claim 1 wherein the oxime is acetone oxime.

4. A codispersion as in claim 1 wherein the oxime is cyclohexanone oxime.

5. A codispersion as in claim 1 wherein the synthetic polymer latex is stable at a pH of from 9.5 to 11 for at least ½ hour.

6. A codispersion as in claim 1 wherein at least 50% by weight of the solids content is the blocked prepolymer.

7. A codispersion as in claim 1 wherein the latex is styrene-butadiene.

8. A codispersion as in claim 1 wherein the latex is an acrylic latex.

9. An aqueous codispersion as in claim 1 wherein the polyol component of the prepolymer is polyoxyethylene glycol admixed with a monomeric alcohol having three hydroxyl groups per mole.

10. A codispersion as in claim 9 wherein the monomeric alcohol is trimethylolpropane or trimethylolethane.

11. The anionically stabilized aqueous codispersion of claim 1 wherein the polyoxyalkylene polyol is selected from (1) essentially linear polyols formed by the reaction of ethylene oxide with an initiator, (2) linear random or block copolymer polyols formed by the reaction of mixtures of ethylene oxide and propylene oxide with an initiator, (3) branched polyols with a hydroxy functionality of at least three formed by reacting alkylene oxides selected from ethylene oxide, propylene oxides and mixtures thereof with a polyfunctional initiator selected from the group consisting of trimethylolpropane, and pentaaerythritol and (4) linear branched polyfunctional polyols formed by the reaction of mixed linear and branched initiators with ethylene oxide or mixtures of ethylene oxide and propylene oxide.

12. A method for preparing an anionically stabilized aqueous codispersion of a blocked urethane prepolymer and a synthetic polymer latex comprising (1) admixing (a) an aqueous dispersion of cationically stabilized hydrophilic polyoxyalkylene urethane prepolymer wherein the isocyanate groups are blocked by formation of a condensation product with an oxime, said block prepolymer being water-dispersible and having a decomposition temperature of from about 140° to 180° C. and (b) an aqueous synthetic polymer latex having a pH of at least 6, and (2) adjusting the pH of the resulting codispersion to at least 9; wherein said synthetic polymer latex is selected from the group consisting of (1) copolymeric latex of a vinyl carboxylic acid with at least one additional ethylenically polymerizable monomer selected from the group consisting of (a) vinyl aromatic hydrocarbons, (b) vinyl aliphatic hydrocarbons, (c) derivatives of acrylic acid, and (d) vinyl chloride, (2) butadiene-acrylonitrile latex, (3) polystyrene latex, (4) vinylpyridine latex, (5) styrene-butadiene latex, and (6) acrylic latex; said blocked prepolymer being the reaction product of a polyoxyalkylene polyol containing at least 50 mole percent ethylene oxide, a molecular weight between about 200 and 20,000 and a hydroxy functionality of from about 2 to 8 with an excess of a polyisocyanate; said blocked prepolymer having a NOH/NCO molar ratio of from about 0.65 to about 1.1; said blocked prepolymer being from about 5 to about 95% of the solids content of said codispersion.

13. A method as in claim 12 wherein the oxime is butanone oxime.

14. A method as in claim 12 wherein the oxime is acetone oxime.

15. A method as in claim 12 wherein the oxime is cyclohexanone oxime.

16. A method as in claim 12 wherein the synthetic polymer latex is stable at a pH of from 9.5 to 11 for at least ½ hour.

17. A method as in claim 12 wherein at least 50% by weight of the solids content is the blocked prepolymer.

18. A method as in claim 12 wherein the latex is styrene-butadiene.

19. A method as in claim 12 wherein the latex is an acrylic latex.

20. A method as in claim 12 wherein the polyol component of the prepolymer is polyoxyethylene glycol admixed with a monomeric alcohol having three hydroxyl groups per mole.

21. A method as in claim 20 wherein the monomeric alcohol is trimethylolpropane or trimethylolethane.

22. A method as in claim 12 wherein the polyoxyalkylene polyol is selected from the group consisting of (1) essentially linear polyols formed by the reaction of ethylene oxide with an initiator, (2) linear random or block copolymer polyols formed by the reaction of mixtures of ethylene oxide and propylene oxide with an initiator, (3) branched polyols with a hydroxy functionality of at least three formed by reacting alkylene oxides selected from the group consisting of ethylene oxide, and propylene oxides with a polyfunctional initiator selected from trimethylolpropane, and pentaerythritol, and (4) linear branched polyfunctional polyols formed by the reaction of mixed linear and branched initiators with ethylene oxide or mixtures of ethylene oxide and propylene oxide.

* * * * *